Figure 1:
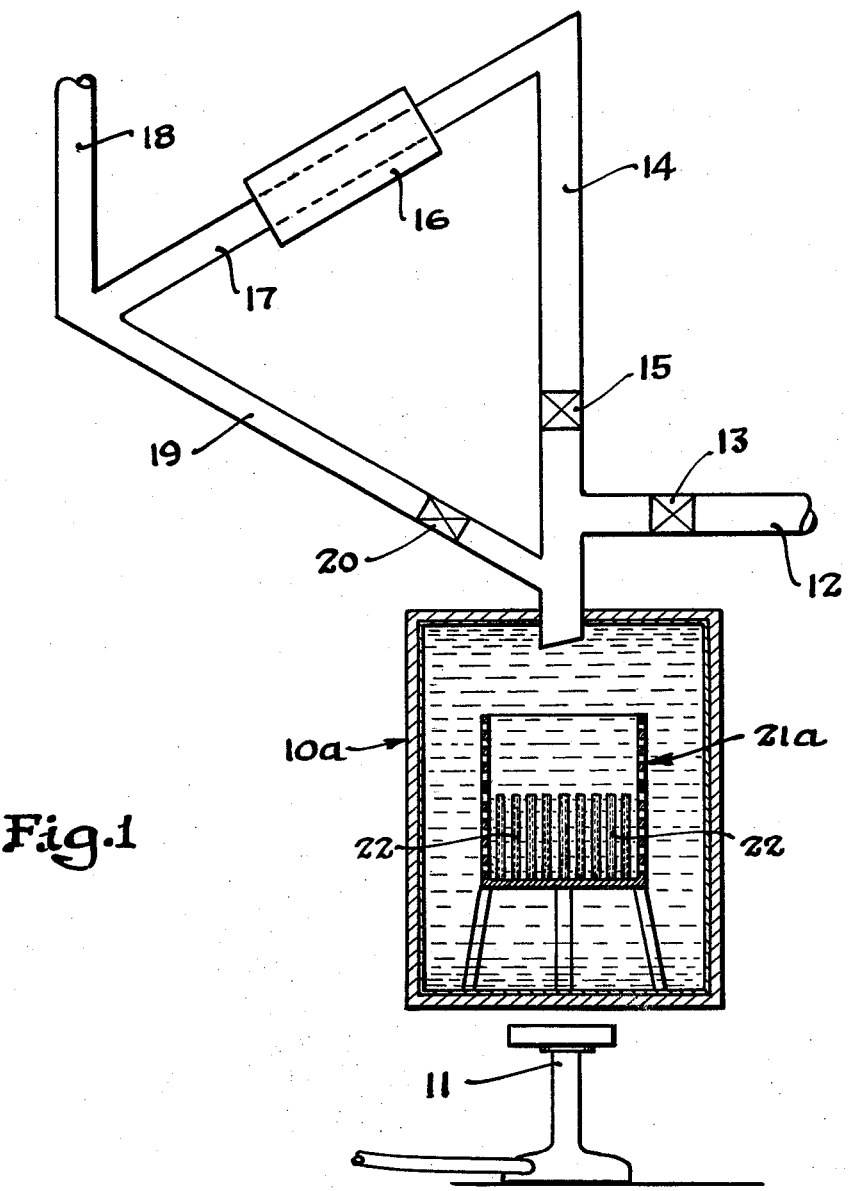

June 29, 1965

J. V. VAUGHEN ET AL 3,192,084

METHOD OF REMOVING MALLEABLE CORES FROM
METALLIC TUBULAR MEMBERS

Filed Dec. 18, 1961

2 Sheets-Sheet 1

Inventors
John V. Vaughen
Albert H. Wilson, Jr.
By Davis, Lindsey, Hibben & Noyes
Attorneys United States Patent Office 3,192,084
Patented June 29, 1965

3,192,084
METHOD OF REMOVING MALLEABLE CORES FROM METALLIC TUBULAR MEMBERS
John V. Vaughen, Volusia County, Fla., and Albert H. Wilson, Jr., New Haven County, Conn., assignors, by mesne assignments, to Brunswick Corporation, Chicago, Ill., a corporation of Delaware
Filed Dec. 18, 1961, Ser. No. 160,027
9 Claims. (Cl. 156—3)

The present invention relates generally to a method of manufacturing small diameter tubular sections and more particularly to an improved method of removing a malleable core element from a hypodermic needle cannula and to apparatus for carrying out said method.

Cannulae for hypodermic needles can be made, for example, by drawing through one or more suitable dies an extended length of a tubular wire, such as a coil of tubular stainless steel wire having an outside diameter of .20 inch and a wall thickness of about .040 inch. The tubular wire is preferably formed upon a mandrel or core element comprising a malleable metal wire. The malleable mandrel or core is preferably a metal, such as copper, aluminum, nickel or soft carbon steel. The mandrel can be in the form of a tubular or cylindrical wire. The outer tubular stainless steel wire can be formed by any conventional means, such as welding a strip of stainless steel, and the mandrel can be readily made by a conventional drawing operation. It is also possible to form the outer tubular wire about the mandrel continuously by having a preformed mandrel or core laid upon a small tape of stainless steel and forming the tape about the mandrel followed by welding the tape to form a stainless steel tube. After the outer tube and mandrel have been subjected to one or more drawing operations, straightened and cut into suitable lengths, the mandrel or core is removed.

Heretofore, attempts have been made to remove the mandrel or core, such as a copper wire core, from a stainless steel outer tubular cannula by subjecting the copper core to contact with a hot nitric acid solution. These prior attempts to remove an extended length of core element from a small diameter passage, such as encountered in a hypodermic needle cannula, have been entirely unsuccessful commercially because the hot nitric acid solution is unable to remove the copper core rapidly from a small diameter passage. For example, a stainless steel cannula with an .023 inch interior diameter (I.D.) filled with a copper core requires about 24 hours treatment with hot nitric acid by present methods to remove a 1.5 inch section of copper core. When the I.D. of the cannula is smaller, several weeks and even months are required to remove a 1.5 inch section of copper core.

It is therefore an object of the present invention to provide an improved chemical process for removing a core element from a small diameter passage.

It is a further object of the present invention to provide an improved process for substantially increasing the rate of chemically removing a core element from a small diameter tubular member.

It is a still further object of the present invention to provide a more economical method of manufacturing hypodermic needle cannulae.

It is also an object of the present invention to provide an improved apparatus for use in a chemical process of removing a core element from a small diameter tubular member wherein the chemical solution is continuously replenished as the process continues.

Figure 2:
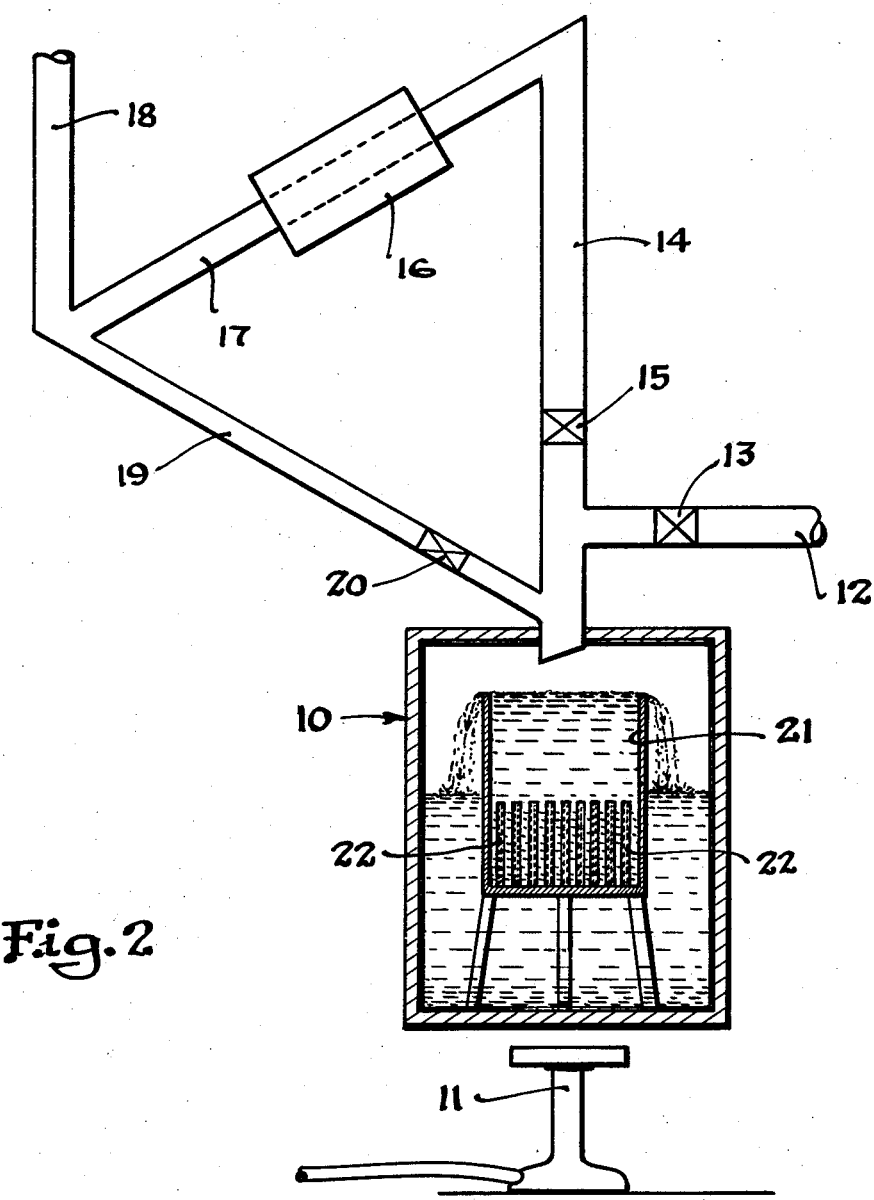

Other objects of the present invention will be apparent from the detailed description and claims to follow when read in conjunction with the accompanying drawing wherein:

FIG. 1 is a diagrammatic illustration of one arrangement of apparatus suitable for use in the present invention as shown; and FIG. 2 is a diagrammatic illustration of another arrangement of apparatus which can be used in the present invention.

It has been discovered that the rate of chemically removing a malleable core element, such as a copper wire core, from the interior of a small diameter tube, such as a 20 gauge hypodermic needle cannula having a length of about 1½ inches and an inner diameter of about 0.023 inch, can be greatly increased from the above indicated normal rate to a rate of about 1.5 inches in about 3 hours, by immersing the cannula in a heated vessel containing a core element solubilizing reagent, such as a strong oxidizing acid solution, and imposing variations in pressure on the solution in which the tube is immersed.

More particularly, the process of the present invention can be carried out in one embodiment thereof by immersing a small diameter tubular member, such as the 20 gauge stainless steel hypodermic needle cannula which supports a malleable core element therein, in a pressure vessel containing strong nitric acid, and connecting a pressure regulating apparatus with the interior of the pressure vessel containing the cannula and acid solution so that a series of short pulses or changes in pressure can be effected by the application of pressure in excess of the normal atmospheric pressure. However, the pressure applied does not necessarily have to be of a high order nor applied for a prolonged period, as will be hereinafter shown.

It has been found that the foregoing process of the present invention can be used commercially to remove a copper core, for example, from a small diameter stainless steel hypodermic needle cannula. Thus a very substantial increase in the rate of removal of a copper core from a stainless steel hypodermic needle cannula can be achieved by applying to a strong acid solution in contact with the cores of a cannula, a super-atmospheric pressure ranging between about 16 p.s.i. to 1000 p.s.i. for a period of between 1/60 second to 30 seconds, and repeating the application of pressure periodically at a frequency ranging between 1/60 second to 30 seconds. Higher pressures can be applied, if desired, without departing from the inventive concept of the present invention.

It will be understood that the super-atmospheric pressure can be readily applied to the core solubilizing reagent by connecting the interior of a vessel containing the reagent and cannulae to a suitable gaseous fluid compressor through any suitable valve means which periodically places the interior of the vessel in communication with a suitable compressor.

The oxidizing acid solution which can be used to react with a copper core element of a cannula can be a nitric acid solution having a concentration ranging between 10% and 75%, although it is preferred to use a relatively strong nitric acid (65%) solution rather than the weaker (10%) solution thereof. Commercial concentrated nitric acid (65% nitric acid) is entirely satisfactory for use in the present invention. If preferred, however, a solution of another oxidizing acid can be used in place of nitric acid, such as chloric acid or perchloric acid.

A suitable arrangement of apparatus with which the process of the present invention can be carried out is shown schematically in FIG. 1 of the drawing and, wherein hypodermic needle cannula stock having a core element therein and drawn to the desired size, straightened an dcut to length are stacked in any desired manner within a heated pressure chamber 10a having a glass or stainless steel lining and wherein the cannulae 22 are placed in a cannulae supporting container 21a disposed within chamber 10a which is substantially filled with an oxidizing acid solution, such as nitric acid, or by another suitable core solubilizing reagent. A source of heat, such as burner 11, is provided to heat the chamber 10a and its contents to the boiling point of the acid solution. The chamber 10a has a conduit 12 communicating with the interior thereof through valve means 13 which is connected to a suitable compressor (not shown). A second conduit 14 communicates with the interior of the chamber 10a through valve means 15 and connects with a condenser means 16 which is adapted to condense or liquify the vapors passing from the heated chamber 10a through conduit 14. Any vapor, such as acid fumes, not liquified by the condenser means 16 are conveyed through the conduit 17 to an absorption means 18 such as a column or tower, which contains suitable material for neutralizing or absorbing the acid fumes or other gases. The condensed substantially pure regenerated acid in liquid form is returned from the condenser means 16 to the chamber 10a by means of conduits 17 and 19 through valve means 20, thereby preventing contamination of the atmosphere.

The apparatus shown in FIG. 2 of the drawing is similar to that of FIG. 1, except that the chamber 10 (which is of the same construction as chamber 10) is only partially filled with acid solution and the supporting container 21 has imperforate walls. Thus, regenerated condensed acid is conducted from conduit 19 into container 21 and tends to continuously provide a source of relatively concentrated acid for contacting the core elements of the cannulae. The liquid overflow from the vessel 21 comprises acid contaminated with reaction products, such as copper nitrate, and is collected in the bottom of pressure chamber 10 where it is in heat-exchange contact with the interior of the vessel 21 and is reheated by burner 11 to the boiling point of the acid forming pure acid vapors which pass upwardly through conduit 14 and are again liquified in the condenser means 16 to form regenerated acid which is returned to vessel 21 through conduit 19. In this way a continual supply of substantially pure acid is provided in the cannulae core treating vessel 21.

In the operation of each of the foregoing arrangements, the valve means 15 and 20 are closed and the valve means 13 opened to place the interior of the pressure chamber 10 or 10a containing the cannula stock therein covered with a strong acid solution in communication with a suitable source of air pressure. As soon as the desired pressure is applied to the acid solution in chamber 10 or 10a, the valve means 13 is closed. After the pressure has been applied to the acid solution in chamber 10 or 10a for a predetermined period, the valve means 15 is opened and the pressure in the chamber 10 or 10a is released, whereupon vapors pass upwardly from the conduit 14 to the condenser means 16 where substantially all the vapors are condensed. The valve means 20 is opened to allow the condensate to return to the chamber 10 or 10a and any uncondensed vapor is absorbed in the column 18. The valve means 15 and 20 are then closed and valve means 13 opened to repeat the pressure cycle. It will be understood that the valve means 13, 15 and 20 are preferably sequentially controlled automatically by a suitable control mechanism so that the pressure variations on the acid solution in the chamber 10 or 10a can be continued regularly throughout the period of treatment of the cannula stock. From time to time the copper nitrate formed by the reaction between the nitric acid and the copper core can be recovered as a by-product. It will be evident that, as required, fresh nitric acid can be added to the chamber 10 to replenish and maintain the desired acid concentration therein.

In order to fully understand the operation of the present invention the following specific examples are set forth without, however, limiting the present invention to the precise conditions and operations described therein.

Example I

Cannula stock comprising 20 gauge stainless steel tubing having an inner diameter of 0.023 inch and a length of 1½ inches with a cylindrical copper wire core therein is placed in vessel 21 within the heated pressure chamber 10 and immersed in a concentrated nitric acid solution, d. 1.40–1.42, containing about 65% $HNO_3$. The contents of the chamber 10 are then subjected to cyclic super-atmospheric pressure treatment in the manner heretofore described and wherein a super-atmospheric pressure of 90 p.s.i. is applied for a period of one second and repeated at a frequency of one second (i.e. after a one second waiting period). The copper core within the said 1½ inch long cannula stock is completely removed after being subjected to said treatment for a period of about 3 hours.

A conventional stainless steel cannula stock wich can be used in the preceding example has the following approximate composition: chromium 16 to 20%, nickel 7 to 10%, carbon 0.08% (maximum), manganese 0.54% (maximum), silicon 0.50% (maximum), sulphur 0.025% (maximum), and phosphorus 0.025% (maximum), with the remainder being essentially iron.

The core element of the cannula stock used in the preceding Example I has been copper. It should be understood, however, that other formable materials can be used for the core element provided, of course, that the material has chemical and physical properties which give it significantly different solubility characteristics from those of the cannula with which it is used and that there is an available solubilizing reagent therefore. For example, suitable materials for a core element for use in a stainless steel cannula include soft, ductile or malleable metals, such as soft carbon steel, aluminum, and nickel. The latter metals can be chemically removed by contacting with nitric acid in the same manner as described in the preceding examples. Also, it is within the scope of the present invention to use a non-metallic composition as a ductile core element. For example, compressible plastic compositions or materials may be used to form the core element, and these plastic core elements can also be removed by the process of the instant invention. Thus, a plastic core element can be removed in accordance with the present invention by selecting a core solubilizing reagent, such as a suitable organic solvent or other chemical reagent, which will dissolve or chemically attack the core material and transform the core into a form other than solid, such as a soluble liquid product, and without causing harm to the tubular member. In the removal of either a metallic or a non-metallic core element, of course, the selection of the core solubilizing reagent with which to contact the core element for removal thereof, will, in each instance, depend on the chemical and physical properties of the core element and the tubular member. The selection of the most suitable reagent for use with a particular material in accordance with the teaching of the present invention is, of course, within the skill of the trained chemist and is not a part of the present invention.

While the applicants do not wish to be limited or restricted by any theory of operation, it is believed that the present invention is able to achieve a substantially improved result by making it possible to have fresh acid solution remain substantially continuously in direct contact with the surface of the core so that chemical attack thereof is not blocked by a film of gas or otherwise interrupted, and by providing a substantially continuous supply of fresh chemical reagent to the exposed surface of the core element. In attempts to remove a copper core from the cannula by treatment with acid without any variation pressure according to the present invention, the cannula passage and/or the end surfaces of the core appear to be blocked by gases formed when the acid initially reacts chemically with the copper core and prevents further contact of the core by fresh acid. When the procedure of Example I is followed, however, gases formed within the cannula do not accumulate on the surface of the core nor block the cannula. It appears that the gases formed within the cannula are forced into solution in the acid by the pressure variations produced in accordance with the present invention. Thus, when a change in the pressure on the fluid reagent in contact with the cannula core is effected in the present invention, it appears that the amplitude of the pressure change is sufficient to compress any existing pockets of gas and force the gas into solution in the corrosive reagent. Also, the changes in pressure appear to effect a sufficient circulation of the reagent in the cannula passage so that the core element is continuously contacted by fresh reagent.

Others may practice the invention in any of the numerous ways which are suggested to one skilled in the art, by this disclosure, and all such practice of invention are considered to be a part hereof which fall within the scope of the appended claims.

We claim:
1. In a process of making elongated metal cannulae including the steps of providing a length of metal tubing formed about a small diameter malleable metal core having an exposed surface area substantially less than said tubing within which said core is disposed and having different chemical properties from that of the said tubing, and removing said metal core from said tubing by chemically treating said tubing and core with a corrosive solution causing a gaseous reaction product having limited solubility in said solution to be formed within said tubing with said gaseous reaction product tending to remain within said tubing and to block further chemical reaction between said corrosive solution and said metal core, the improvement comprising; immersing a plurality of said elongated metal cannulae each having a malleable metal core in a corrosive solution for said metal core within a pressure chamber and heating said corrosive solution in said chamber, effecting within said chamber periodic variations in pressure by closing said chamber against contact with the surrounding atmosphere, connecting the interior of said chamber with a source of super-atmospheric pressure through a pressure regulating means to provide within the interior of said chamber a predetermined super-atmospheric pressure and maintaining said predetermined super-atmospheric pressure within said chamber for a predetermined period, disconnecting the interior of said chamber from said source of super-atmospheric pressure whereupon the pressure in said chamber returns to normal atmospheric pressure and remains at normal atmospheric pressure until a super-atmospheric pressure is again applied, and periodically conveying from said chamber while said chamber remains at normal atmospheric pressure an accumulation of gases formed therein, and successively repeating said variations in pressure with intermittent removal of accumulation of said gases; thereby effecting removal of the metal core from an elongated length of metal tubing at an accelerated rate to provide a small diameter passage through said elongated metal tubing.

2. A process according to claim 1, wherein said elongated metal cannulae are hypodermic needle cannulae.

3. A process according to claim 1, wherein said tubing is stainless steel tubing and said core is copper.

4. A process according to claim 3, wherein said corrosive solution is a concentrated nitric acid solution.

5. A process according to claim 4, wherein said corrosive solution is heated at the boiling point of said concentrated nitric acid solution, and said accumulation of gases is conveyed from said chamber into a condensing means which condenses nitric acid gas into liquid nitric acid, and thereafter returning said liquid nitric acid to said chamber.

6. A process according to claim 1, wherein the said predetermined super-atmospheric pressure is about 90 pounds per square inch and said predetermined period is about one second.

7. A process according to claim 1, wherein the said predetermined super-atmospheric pressure is about 90 pounds per square inch and said super-atmospheric pressure is maintained for a period of at least one second and a maximum of thirty seconds.

8. A process according to claim 1, wherein the pressure within said chamber remains at normal atmospheric pressure for about one second before again connecting said chamber with said source of super-atmospheric pressure.

9. In a process of making hypodermic needle cannulae ncluding the steps of providing a length of stainless steel tubing formed about a small diameter malleable copper core having an exposed surface area substantially less than said tubing within which said core is disposed and having different chemical properties from that of the said tubing, and removing said copper core from said tubing by chemically treating said tubing and core with a concentrated nitric acid solution causing a gaseous reaction product having limited solubility in said solution to be formed within said tubing with said gaseous product tending to remain within said tubing and to block further chemical reaction between said nitric acid solution and said copper core, the improvement comprising; immersing a plurality of said hypodermic needle cannulae each having a malleable copper core in said nitric acid solution within a pressure chamber and heating said nitric acid solution in said chamber, effecting within said chamber periodic variations in pressure by closing said chamber against contact with the surrounding atmosphere, connecting the interior of said chamber with a source of super-atmospheric pressure through a pressure regulating means to provide within the interior of said chamber a pressure of about 90 pounds per square inch and maintaining said predetermined super-atmospheric pressure within said chamber for a period of at least one second and a maximum of thirty seconds, disconnecting the interior of said chamber from said source of super-atmospheric pressure whereupon the pressure in said chamber returns to normal atmospheric pressure and remains at normal atmospheric pressure until a super-atmospheric pressure is again applied, and periodically conveying from said chamber while said chamber remains at normal atmospheric pressure an accumulation of gases formed therein, and successively repeating said variations in pressure with intermittent removal of accumulation of said gases; thereby effecting removal of the copper core from said hypodermic needle cannulae at an accelerated rate to provide a small diameter passage through said hypodermic needle cannulae.

References Cited by the Examiner
UNITED STATES PATENTS

| | | | |
|---|---|---|---|
| 1,823,709 | 7/31 | Taylor | 156—24 |
| 2,235,658 | 3/41 | Waterman | 156—19 |
| 2,597,896 | 5/52 | Oster | 134—17 XR |
| 2,679,474 | 5/54 | Pajes | 156—7 XR |
| 2,832,676 | 4/58 | Llewellyn et al. | 156—18 XR |
| 2,994,332 | 8/61 | Leonhardt | 134—184 |
| 3,004,835 | 10/61 | Verner et al. | 156—3 |
| 3,043,362 | 7/62 | Mennesson | 156—18 XR |

ALEXANDER WYMAN, *Primary Examiner.*

JACOB STEINBERG, EARL M. BERGERT, *Examiners.*